United States Patent Office 2,921,037
Patented Jan. 12, 1960

2,921,037

POLYEPOXIDE-AMINE COMPOSITIONS

Karlheinz Andres, Richard Wegler, and Gunter Frank, Leverkusen, Germany, assignors to Farbenfabriken Bayer Aktiengesellschaft, Leverkusen, Germany, a corporation of Germany No Drawing. Application June 12, 1958
Serial No. 741,458

Claims priority, application Germany June 19, 1957

6 Claims. (Cl. 260—2)

The present invention relates to polyepoxide-amine compositions which are valuable compositions for the production of moulded elements.

It is known that polyglycidyl ethers of polyhydric alcohols can be reacted with polyamines to form cross-linked plastics. Owing to their high reactivity, these components are generally not suitable for the manufacture of molded elements having large volume, since the heat of reaction liberated leads to formation of cracks and to carbonization phenomena.

It has also been proposed that epoxy derivatives of aromatic amines with at least two epoxy groups should be converted, in combination with aliphatic polyamines and by the cold curing method, into insoluble plastics. Such mixtures can advantageously be used for the manufacture of large-volume moulded elements, as for example tools, since the hardening continues over a period sufficiently long to allow the heat of reaction set up to be easily dissipated. In this way, the thermal shrinkage is reduced to a minimum, so that maximum dimensional stability of the moulded elements is assured. In many cases it is, however, necessary for the manufacture of special laminated elements to obtain the quickest possible curing of the mixtures, while, however, avoiding the disadvantages referred to above.

It has now been found that mixtures of (1) epoxy derivaties of tertiary amines with more than one epoxy group and (2) polyglycidyl ethers of saturated aliphatic alcohols having at least three hydroxyl groups are excellently suitable for the manufacture of laminated elements if the hardening of these mixtures is effected with (3) aliphatic polyamines. Using these components, it is possible in relatively short hardening times to manufacture large-volume moulded elements, such as for example tools, patterns and gauges, which are characterized by excellent strength properties and are free from cracks and decomposition products.

Examples of suitable epoxy derivatives of amines are such epoxy derivatives of aromatic monoamines, for example aniline, and aromatic diamines, for example bis-(4-aminophenyl)-alkanes and bis-(4-monoalkyl aminophenyl)-alkanes, as contain more than one epoxy group in the molecule, these epoxy groups being bonded to tertiary nitrogen atoms. These compounds can be produced by the process disclosed in French patent specifications Nos. 1,137,175 and 1,137,176. They correspond to the following general formulae:

(1)
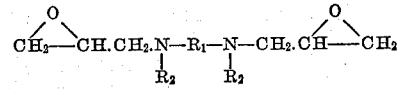
RN=(CH₂—CH——CH₂)₂ wherein R stands for a phenyl group which may be substituted by alkyl (methyl, ethyl, isopropyl), halogen (chlorine), hydroxyalkyl (methoxy, ethoxy, propoxy);

(2)
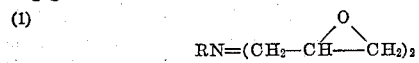
(CH₂—CH.CH₂)₂—N.R₁—N—(CH₂.CH——CH₂)₂ wherein R₁ stands for a bivalent aromatic radical such as phenylene, diphenyl, diphenyl-alkane (diphenyl-methane, diphenyl-ethane, diphenyl-propane), diphenyl-sulfone, diphenyl-ether, diphenyl-sulfide, in which radicals the aromatic nuclei may be substituted by the substituents disclosed in connection with Formula 1).

(3)
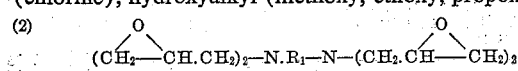
CH₂—CH.CH₂.N—R₁—N—CH₂.CH——CH₂
           |            |
           R₂           R₂ wherein R₁ has the same meaning as in Formula 2 and R₂ stands for a saturated aliphatic or cycloaliphatic radical having 1 to 8 carbon atoms, such as methyl, ethyl, propyl, butyl, cyclohexyl.

Examples of suitable polyglycidyl ethers are the triglycidyl ethers of glycerine, 3,3,3-trimethylol propane, 1,2,6-hexanetriol, 1,3,5-hexanetriol, betahydroxy-ethyl ether of glycerol, the tetraglycidyl ethers of erythritol, pentaerythritol, betahydroxy-ethyl ether of pentaerythritol, diglycerol and the polyglycidyl ethers of sorbitol, mannitol, inositol, triglycerol, dipentaerythritol, tripentaerythritol, in which at least three glycidyl ether radicals are contained. Such polyglycidyl ethers are for instance disclosed in U.S. patent specification 2,538,072.

As aliphatic polyamines it is possible to use alklylene-amines and polyalkylene polyamines such as ethylene diamine, diethylene triamine, triethylene tetramine and tetraethylene pentamine, propylenediamine, dipropylenetriamine, tripropylenetetramine, N,N-aminoethyl aminopropylamine, N,N'-dipropylaminoethylene diamine, butylenediamine, hexamethylene diamine, for example. The N-alkylated derivatives of these amines in which the hydrogen atoms of the amino- or imino-groups are at least partially replaced by alkyl groups (methyl, ethyl, propyl), are also suitable.

In preparing the mixtures of the aforementioned components the epoxy derivatives of tertiary amines are preferably applied in amounts of 20–80 parts by weight and the polyglycidyl ethers in amounts of 80 to 20 parts by weight.

The aliphatic polyamines are generally used in amounts of 5 to 30 percent by weight as calculated on the total amount of the epoxy derivatives and of the polyglycidyl ethers. The mixtures are cured at room temperature. If desired elevated temperatures between about 30 to 120° C. may be used in order to accelerate the curing of the mixtures. These mixtures can be used for the manufacture of cold-hardened synthetic resin tools, if desired with the addition of fillers such as powdered quartz, ground shale, talcum and similar mineral materials. The procedure is that first of all the mixture, ready for processing, is applied in a thin layer (thickness of 2 to 5 mm.) to a mould made of gypsum, wood or metal, from which a negative is to be prepared, the layer setting after 20–60 minutes, depending on the proportion of the polyglycidyl ethers. The epoxy derivatives of aromatic amines by comparison only set after 6–12 hours. Consequently, the mixtures in accordance with the invention allow the further work for making the tool to be carried out after quite a short time. This takes place in such a way that, depending on the stresses to which the completed component will be subjected, a number of glass silk fabrics are applied and impregnated with the same mixture as used for forming the thin layer. In the manufacture of patterns and gauges, this manipulation is unnecessary in many cases. After a short time, the main quantity of the mixture consisting of resin, hardener, filler can be used for filling or lining purposes. This mixture is usually made less reactive by raising the proportion of epoxy derivatives of aromatic amines in order to avoid stresses in the material. The synthetic resin tool can be removed from the mould after 12–24 hours. It is characterized by good strength properties, high dimensional stability and good resistance to water.

Further details will be seen from the following examples.

EXAMPLE 1

The triglycidyl ether of 3,3,3-trimethylol propane (compound I) is produced in known manner by reacting 3,3,3-trimethylol propane with epichlorhydrin in the molar ratio of 1:3 in the presence of $H_2SO_4$ as catalyst at about 90 to 116° C. for 8 to 12 hours and subsequently treating the resulting tri(3-chloro-2-oxy-propyl)-ether of 3,3,3-trimethylol propane with 300 cc. of a 45% aqueous sodium hydroxide solution at 20–30° C. for about 8 hours. The epoxide equivalent of the reaction product which is obtained is 179, and the chlorine content is 5.7%.

The difunctional ethylene oxide derivative of bis-(4-monomethyl aminophenyl)-methane (compound II) is obtained in known manner by reacting bis-(4-monomethyl aminophenyl)-methane with epichlorhydrin and subsequently treating the product with a concentrated aqueous sodium hydroxide solution. The epoxide equivalent is 262. The reaction behaviour, the mechanical strength properties and the water absorption of the pure polyepoxides (compound I and compound II) and different mixtures thereof after hardening with triethylene tetramine at room temperature will be seen from Table I. The gelling time and the maximum reaction temperature were determined with a 100 g. pot mixture.

This table clearly shows the advantages of the epoxide compound mixtures as compared with the pure components. The setting times are such as are required in the making of tools and moulds, especially thin and laminated layers, with a simultaneous improvement in the mechanical strength properties of the polyaddition products which are obtained.

*Table I*

| | Compound I | Compound II | Compound I+ Compound II | | |
|---|---|---|---|---|---|
| | | | 70:30 | 50:50 | 30:70 |
| g. of triethylene tetramine/ 100 g. of compound | 13.5 | 15 | 14 | 14 | 14.5 |
| gelling time (minutes) | 8 | 480 | 22 | 33 | 55 |
| maximum reaction temperature (° C.) | 300 | 25 | 300 | 290 | 250 |
| Brinell hardness (kg./cm.²): | | | | | |
| 10 sec | 1,120 | 1,350 | 1,180 | 1,220 | 1,295 |
| 60 sec | 1,050 | 1,280 | 1,115 | 1,152 | 1,220 |
| impact strength (kg. cm./cm.²) | 9.9 | 1.5 | 8.5 | 7.9 | 6.3 |
| bending strength (kg./cm.²) | 1,315 | 760 | 1,390 | 1,420 | 1,422 |
| bending angle | 20 | 11 | 18 | 17 | 17 |
| water absorption (percent) after 24 hours at a temperature of: | | | | | |
| 22° C | 4.28 | 0.34 | 2.74 | 1.01 | 0.48 |
| 50° C | 10.4 | 0.82 | 4.10 | 2.36 | 1.21 |
| 90° C | 17.2 | 2.93 | 10.3 | 7.81 | 4.26 |

EXAMPLE 2

The triglycidyl ether of 1,2,6-hexanetriol (compound III) is produced in known manner by reacting 1,2,6-hexanetriol with epichlorhydrin in the molar ratio of 1:3 and in the presence of $H_2SO_4$ as catalyst and subsequently treating the resulting tri-(3-chloro-2-oxypropyl)-ether of 1,2,6-hexanetriol with sodium hydroxide solution as disclosed in Example 1. The epoxide equivalent of the resulting reaction product is 168 and the chlorine content is 5.6%.

The compound II described in Example 1 is used for mixing with compound III.

Table II shows the reaction behaviour, the mechanical strength properties and the water absorption of the pure polyepoxides (compound III and compound II) and different mixtures thereof, which have been hardened with triethylene tetramine. The gelling time and the maximum reaction temperature were determined with a 100 g. mixture. Table II shows that the properties of compound III are less satisfactory than those of compound I referred to in Example 1; when compound III is suitably combined with compound II, however, mixtures are obtained which satisfy the conditions required of casting compounds which are used in the making of tools and moulds.

*Table II*

| | Compound III | Compound II | Compound III+ Compound II | | |
|---|---|---|---|---|---|
| | | | 70:30 | 50:50 | 30:70 |
| g. of triethylene tetramine/ 100 g. of compound | 14.5 | 15 | 15 | 15 | 15 |
| gelling time (minutes) | 22 | 480 | 37 | 57 | 107 |
| maximum reaction temperature (° C.) | 300 | 25 | 270 | 250 | 200 |
| Brinell hardness (kg./cm.²): | | | | | |
| 10 sec | 661 | 1,350 | 853 | 1,100 | 1,175 |
| 60 sec | 548 | 1,280 | 765 | 1,030 | 1,115 |
| impact strength (kg. cm./cm.²) | 34.5 | 1.5 | 24.6 | 21.3 | 8.1 |
| bending strength (kg./cm.²) | 505 | 760 | 929 | 1,266 | 1,284 |
| bending angle | 64 | 11 | 48 | 29 | 18 |
| water absorption (percent) after 24 hours at a temperature of: | | | | | |
| 22° C | 12.7 | 0.34 | 13.0 | 4.61 | 1.36 |
| 50° C | 22.7 | 0.82 | 19.0 | 8.99 | 2.45 |
| 90° C | 26.2 | 2.93 | 24.5 | 13.6 | 7.62 |

EXAMPLE 3

The triglycidyl ether of 1,3,5-hexanetriol (compound IV) is produced in known manner by reacting 1,3,5-hexanetriol with epichlorhydrin in the molar ratio of 1:3 in the presence of $H_2SO_4$ as catalyst and subsequently treating the resulting tri-(3-chloro-oxypropyl)-ether of 1,3,5-hexanetriol with sodium hydroxide solution as disclosed in Example 1. The epoxide equivalent of the resulting reaction product is 220 and the chlorine content is 4.7%.

The compound II described in Example 1 is used for mixing with compound IV.

Table III shows the reaction behaviour, the mechanical strength properties and the water absorption of the pure polyepoxides (compound IV and compound II) and different mixtures thereof. The gelling time and the maximum reaction temperature were determined with a 100 g. pot mixture.

By comparison between compound I and compound III, it will be seen from Table III that compound IV has properties lying between those of these two compounds. The combinations of compound IV with compound II also assume a mid-position between the corresponding combinations of compound I+II and compound III+II as regards their reaction behaviour and the mechanical strength properties of their polyaddition products.

*Table III*

| | Compound IV | Compound II | Compound IV+Compound II | | |
|---|---|---|---|---|---|
| | | | 70:30 | 50:50 | 30:70 |
| g. of triethylene tetramine/ 100 g. of compound | 11 | 15 | 12 | 13 | 14 |
| gelling time (minutes) | 25 | 480 | 41 | 65 | 115 |
| maximum reaction temperature (° C.) | 300 | 25 | 250 | 210 | 180 |
| Brinell hardness (kg./cm.²): | | | | | |
| 10 sec | 771 | 1,350 | 962 | 1,180 | 1,210 |
| 60 sec | 745 | 1,280 | 896 | 1,110 | 1,130 |
| impact strength (kg. cm./cm.²) | 27.3 | 1.5 | 14.3 | 12.1 | 7.8 |
| bending strength (kg./cm.²) | 723 | 760 | 1,150 | 1,310 | 1,390 |
| bending angle | 45 | 11 | 36 | 19 | 18 |
| water absorption (percent) after 24 hours at a temperature of: | | | | | |
| 22° C | 10.3 | 0.34 | 6.55 | 2.88 | 1.23 |
| 50° C | 17.1 | 0.82 | 10.1 | 6.12 | 2.05 |
| 90° C | 20.8 | 2.93 | 15.5 | 10.2 | 5.15 |

We claim:

1. A composition capable of curing at room temperature comprising (1) 20–80 parts by weight of a tertiary aromatic amine, containing at least one tertiary nitrogen atom to which is bonded at least one 2,3-epoxypropyl group, at least two 2,3 epoxypropyl groups being present in said amine, (2) 80–20 parts by weight of a polyglycidyl ether of a saturated aliphatic alcohol having at least three glycidyl ether groups, the latter being the sole reactive groups of said polyglycidyl ether, and (3) an aliphatic polyamine in an amount of about 5 to 30 percent by weight as calculated on the total amount of said amine (1) and said polyglycidyl ether (2).

2. A composition of claim 1 wherein said tertiary amine is selected from the group consisting of (1) 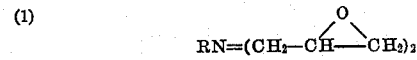

wherein R is a phenyl group;

(2) 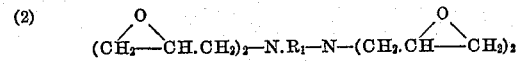

wherein $R_1$ is a bivalent aromatic radical selected from the group consisting of phenylene, diphenyl, diphenyl-alkane, diphenyl-sulfone, diphenyl-ether, and diphenyl-sulfide; and (3) 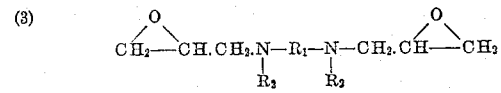

wherein $R_1$ has the same meaning as in Formula 2 and $R_2$ is a substituent selected from the group consisting of monovalent saturated aliphatic and cycloaliphatic radicals having 1 to 8 carbon atoms.

3. A composition of claim 1 wherein said tertiary amine is bis-(monomethyl-amino-2,3-epoxypropyl aminophenyl)-methane.

4. A composition of claim 1 wherein said polyglycidyl ether is a polyglycidyl ether of trimethylol propane.

5. A composition of claim 1 wherein said polyglycidyl ether is a polyglycidyl ether of hexanetriol.

6. A composition of claim 1 wherein said aliphatic polyamine is a polyalkylene polyamine.

References Cited in the file of this patent
UNITED STATES PATENTS
2,730,531    Payne et al. _____ Jan. 10, 1956